United States Patent
Morganson

[19]

[11] Patent Number: 5,676,089
[45] Date of Patent: Oct. 14, 1997

[54] SQUIRREL PROOF BIRD FEEDER

[76] Inventor: Peter H. Morganson, 701 Spanish Main Dr., Lot 318, Summerland Key, Fla. 33042

[21] Appl. No.: 731,585

[22] Filed: Oct. 16, 1996

[51] Int. Cl.$^6$ .................... A01K 39/00; A01K 39/022
[52] U.S. Cl. .................................. 119/52.3; 119/57.9
[58] Field of Search ........................... 119/52.2, 52.3, 119/52.4, 57.8, 57.9

[56] References Cited

U.S. PATENT DOCUMENTS

| | | | |
|---|---|---|---|
| 3,089,461 | 5/1963 | Dunn | 119/51 |
| 3,104,649 | 9/1963 | Slaven | 119/51 |
| 3,126,870 | 3/1964 | Matthew | 119/51 |
| 4,649,865 | 3/1987 | Riggi | 119/57.9 |
| 5,048,461 | 9/1991 | Wessner | 119/52.3 |
| 5,255,631 | 10/1993 | Anderson | 119/52.2 |
| 5,471,951 | 12/1995 | Collins | 119/57.9 |

*Primary Examiner*—Thomas Price
*Attorney, Agent, or Firm*—Kenneth S. Watkins, Jr.

[57] ABSTRACT

A squirrel proof bird feeder comprises a frame 102, a feed chute 112 inside and fixed to frame 102, and a rotatable feed chute cover 114 disposed between frame 102 and feed chute 112. The feed chute has two feed trays 116, 117, and the feed chute cover has two perches 124, 125. Two weights 146, 152, bias the feed chute cover to the normal feeding position. When a bird or other animal exceeding a predetermined weight alights on the perch, the feed chute cover rotates, blocking access to the respective feed tray and dislodging the animal, Different feed may be used in each of the feed trays by use of a divider plate 113. The weights may be adjusted to discriminate different weight birds for each feed tray. A second embodiment of the feeder comprises a single feed tray and one weight.

16 Claims, 4 Drawing Sheets

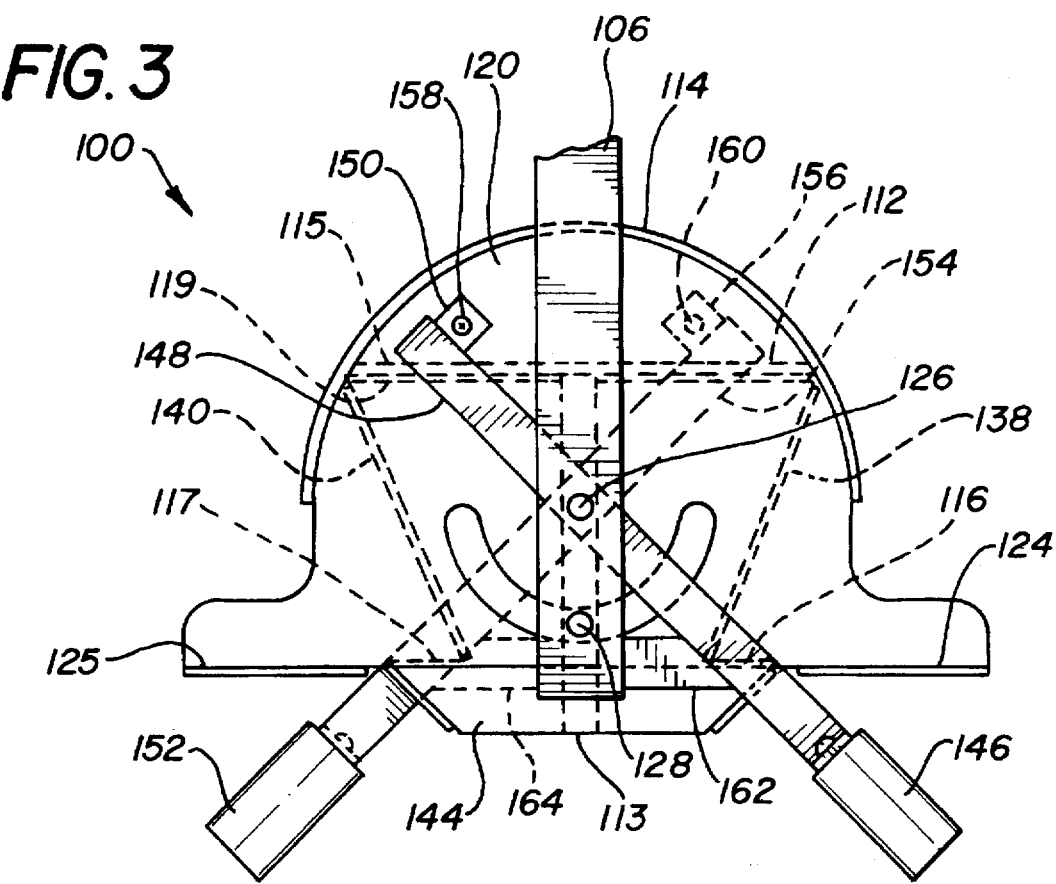
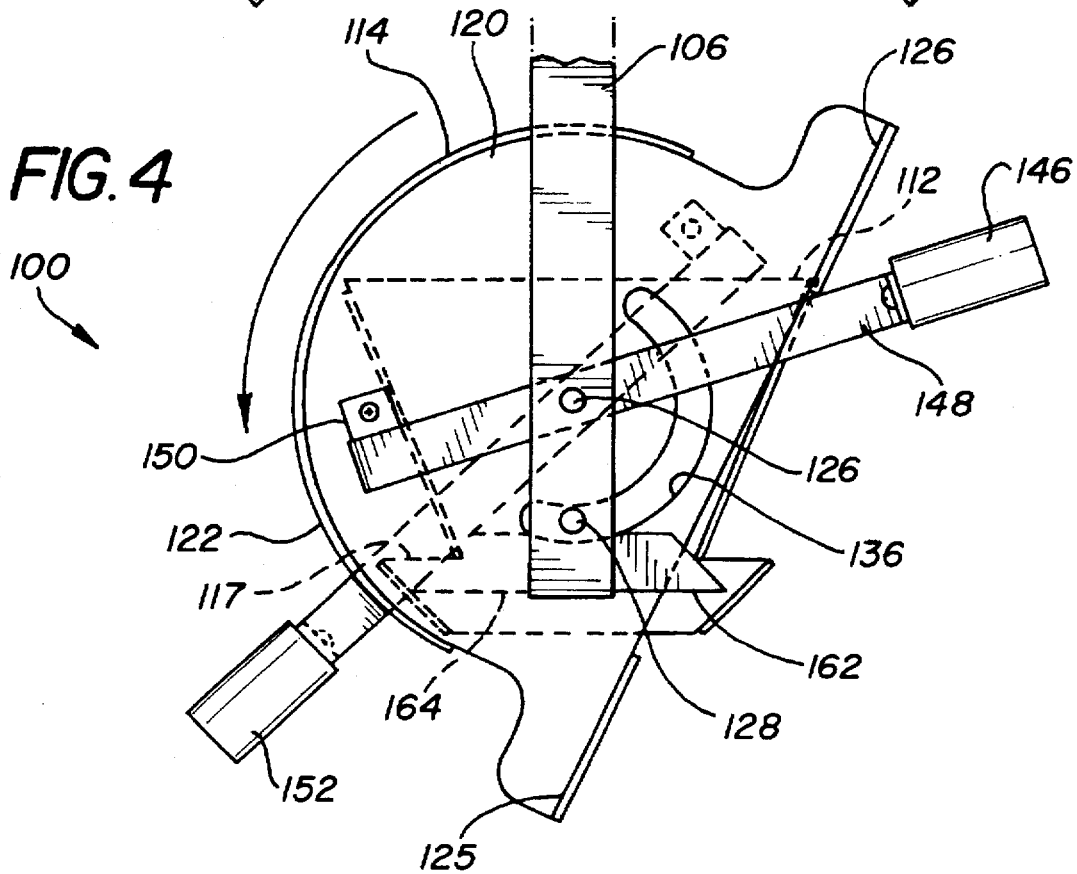

SQUIRREL PROOF BIRD FEEDER

BACKGROUND OF THE INVENTION

The present invention relates to bird feeders and, more particularly, to bird feeders which prevent unwanted animals from feeding at the feeder.

Bird watching has become a very enjoyable activity among a large segment of the population. It also provides an educational tool for children and increases environmental consciousness for many.

Bird feeders mounted in a convenient location for viewing are used to attract a variety of species of birds. Although a bird feeder attracts a number of birds, it often results in undesirable animals such as squirrels at the feeder. These undesirable animals discourage songbirds from the feeder and consume large amounts of the feed. Squirrels often destroy the feeder in attempts to access the feed. Presence of these animals may result in further nuisance and damage to nearby homes.

A large number of feeders have been disclosed which employ various methods to discourage undesirable animals from feeding at the feeder. One example of such a feeder is disclosed in U.S. Pat. No. 5,471,951 to Collins. The feeder tilts upon access by a pest. A tilt-responsive switch connects a source of high voltage to the pest through a set of conductors.

Several devices have been disclosed which utilize a tilting feature to close off the feed supply to a pest at the feeder. An example of such a feeder is disclosed by inventor Slaven in U.S. Pat. No. 3,104,649. The feeder comprises a lean-to housing which pivots to close off the feed supply with a block-out plate. The feeder is mounted from below on a post. Matthew discloses a selective bird feeder in U.S. Pat. No. 3,126,870. An outer drum rotates about a support shaft to close off the feed dispenser when an animal lights upon the edge of the drum. The feeder is mounted to a post.

Although several types of selective bird feeders have been available, there are limitations which have prevented them from being used in many situations. For example, some of the feeders are limited in how they may be mounted from structures. Other designs may discourage feeding of the unwanted animal, but are not effective in dislodging the animal, resulting in damage as the animal tries various means to get to the food. Often the designs are unstable, discouraging many species of birds which desire a stable platform while feeding. Existing feeders do not address the problem of larger birds consuming large quantities of expensive feed except to prevent them from feeding at all.

SUMMARY OF THE INVENTION

Therefore an object of the present invention is to provide a squirrel proof bird feeder which prevents undesired animals from feeding at the feeder.

A further object of the present invention is to provide a squirrel proof bird feeder having a stable platform for birds.

A further object of the present invention is to provide a squirrel proof bird feeder which can be conveniently mounted by many different means such as hanging from a tree limb or overhead structure, mounting to a post or wall, or sitting on a surface such as a picnic table.

A further object of the present invention is to provide a squirrel proof bird feeder which is effective in dislodging an undesired animal to prevent damage to the feeder.

A further object of the present invention is to provide a squirrel proof bird feeder which can feed birds from either side of the feeder.

Yet another object of the present invention is to provide a squirrel proof bird feeder which can be adjusted to provide the desired weight discrimination to the feeder.

Still another object of the present invention is to provide a squirrel proof bird feeder which discriminately allows feeding of different weight birds on each side of the feeder.

The squirrel proof bird feeder of the present invention comprises a U-shaped or O-shaped frame. A feed chute with a feed tray is fixed inside the frame between two opposite frame members. A feed chute cover is pivotally mounted to the frame between the feed chute and the frame. The feed chute cover is rotateable between two positions. In the first position, the feed tray is open to a perch mounted on chute cover. In the second position, the chute cover is rotated about a pivot point of the chute cover whereby the arcuate shaped top of the feed chute cover is between the feed tray of the feed chute and the perch on the feed chute cover.

In the second position, any animal on the perch is not able to feed from the feed tray because of the interference of the top of the feed chute cover. The animal is dislodged from the perch due to the large inclined angle of the perch. Even if the animal is not dislodged, the arcuate shape prevents the animal from climbing onto the top of the feeder to access the feed chute. The combined effect of preventing access to the feed tray, dislodging the animal by the angled perch, and inability of the animal to cling to the top of the chute cover thoroughly discourages the animal from repeated attempts at feeding.

The arcuate shaped top to the feed chute cover allows a large angle of rotation, typically greater than 30 degrees and preferably greater than 45 degrees from the first position, which increases the effectiveness of the device in dislodging the undesired animal. The effectiveness of the feeder in dislodging the undesired animal allows much of the feeder to be constructed of soft materials such as wood without the animal being able to destroy the feeder.

The preferred embodiment of the present invention comprises a feed tray at either side of the feed chute. The chute cover includes a perch on both sides, each of which is accessible to the respective feed tray when the feed chute is in the first position. The feeder has three positions, a normal centered position where both perches are accessible to their respective feed trays. The second position is when the feed chute cover is rotated counterclockwise, preventing access to one of the feed trays. The third position is when the feed chute cover is rotated in a clockwise direction, preventing access to the other feed tray.

The feed chute is located between the vertical columns of the frame and fixed to the frame by a through shaft fixed to the columns, and a second member extending between the columns. The feed chute cover is biased in the first position by two weights. The first weight biases the feed chute cover toward the first position when the feed chute cover is rotated in a clockwise direction toward the second position. The second weight biases the feed chute cover toward the first position when the feed chute cover is rotated in a counterclockwise direction toward the third position. Stops located on the feed chute cover ends and the frame ensure that only one weight (the one restoring feed chute cover rotation to the first position) is engaged at the time. In this manner, a substantial upsetting moment must exist (as would be the case if a squirrel accessed a perch) in order to rotate the feed chute cover. This feature results in a very stable perch for birds.

The use of two perches, two feeding trays, and the novel dual weight system allows different feed to be used at each side of the feeder. The weights may be adjusted to prevent feeding from one of the trays by larger birds than the other tray. In this way, large birds can be fed a low cost feed while preventing them from consuming large amounts of expensive feed.

BRIEF DESCRIPTION OF THE DRAWINGS

These and other features, aspects and advantages of the present invention will become better understood with regard to the following description, appended claims and accompanying drawings where:

FIG. 3 is an end view of embodiment 100 of the feeder of FIG. 1 in the normal feeding position looking at end 120 of feed chute cover 114 and showing optional divider plate 113 and optional secondary feed chute cover 115;

FIG. 4 is an end view of embodiment 100 of the feeder of FIG. 1 in the dislodging position looking at end 120 of feed chute cover 114.

DESCRIPTION OF THE PREFERRED EMBODIMENTS

The following is a description of the preferred embodiments of a squirrel proof bird feeder which provides a stable platform for birds and effectively prevents larger animals from feeding.

Figure 1:
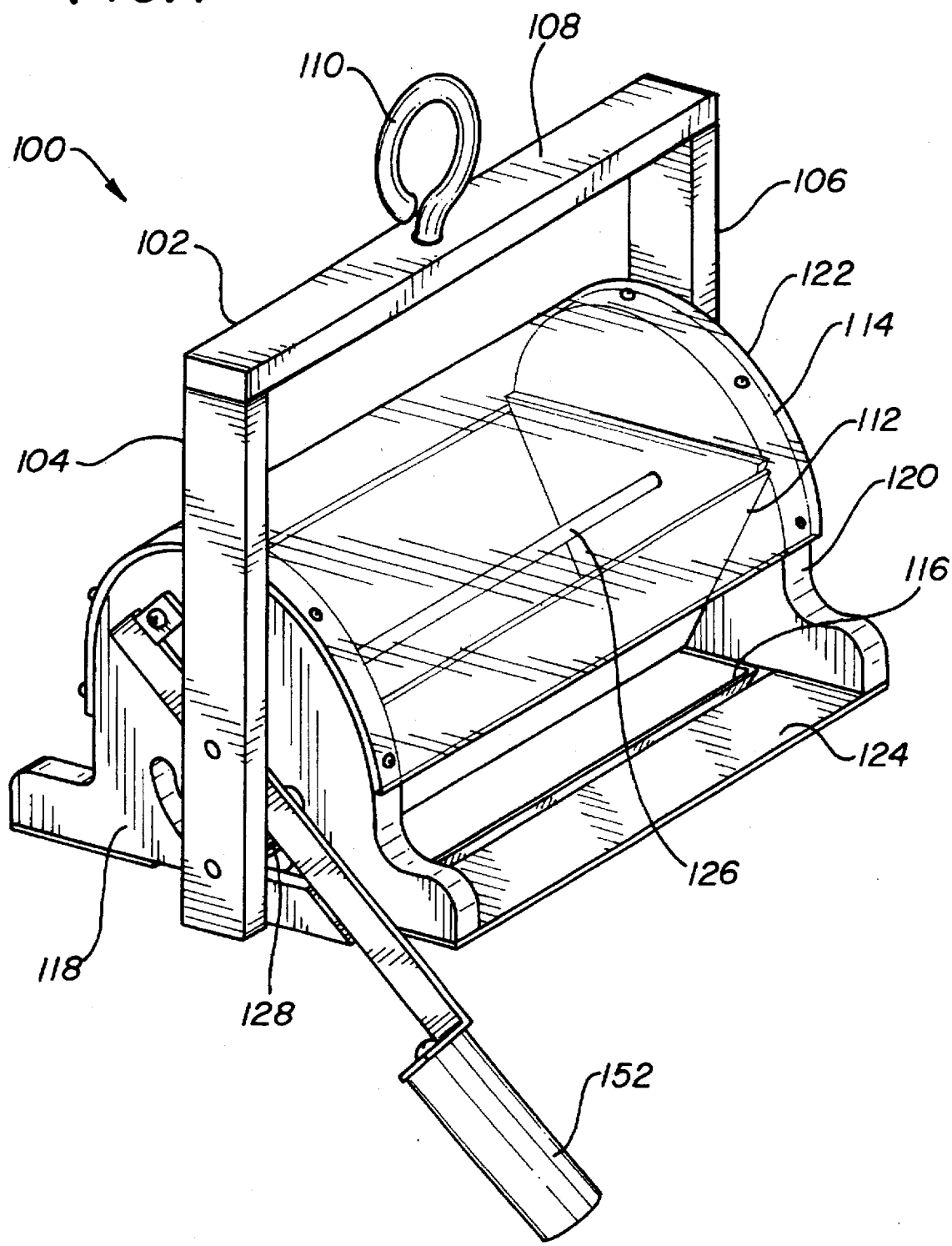
FIG. 1 is a perspective drawing of the preferred embodiment of the squirrel proof bird feeder in the normal feeding position.

FIG. 1 is a perspective drawing of embodiment 100 of the feeder. The feeder of this embodiment allows feeding from both sides. Frame 102 is generally U-shaped, made up of column 104, column 106, and cross member 108. Hook 110, attached to frame 102, provides a means to hang the feeder from a tree limb, beam, or other overhead support.

Feed chute 112, shown under transparent chute cover 114, provides storage for bird feed (not shown) and maintains feed in feed tray 116. Chute cover 114 comprises first end 118, second end 120, and arcuate top 122. Perch 124 provides a location for a bird (not shown) to light and provide access to feed tray 116.

Figure 2:
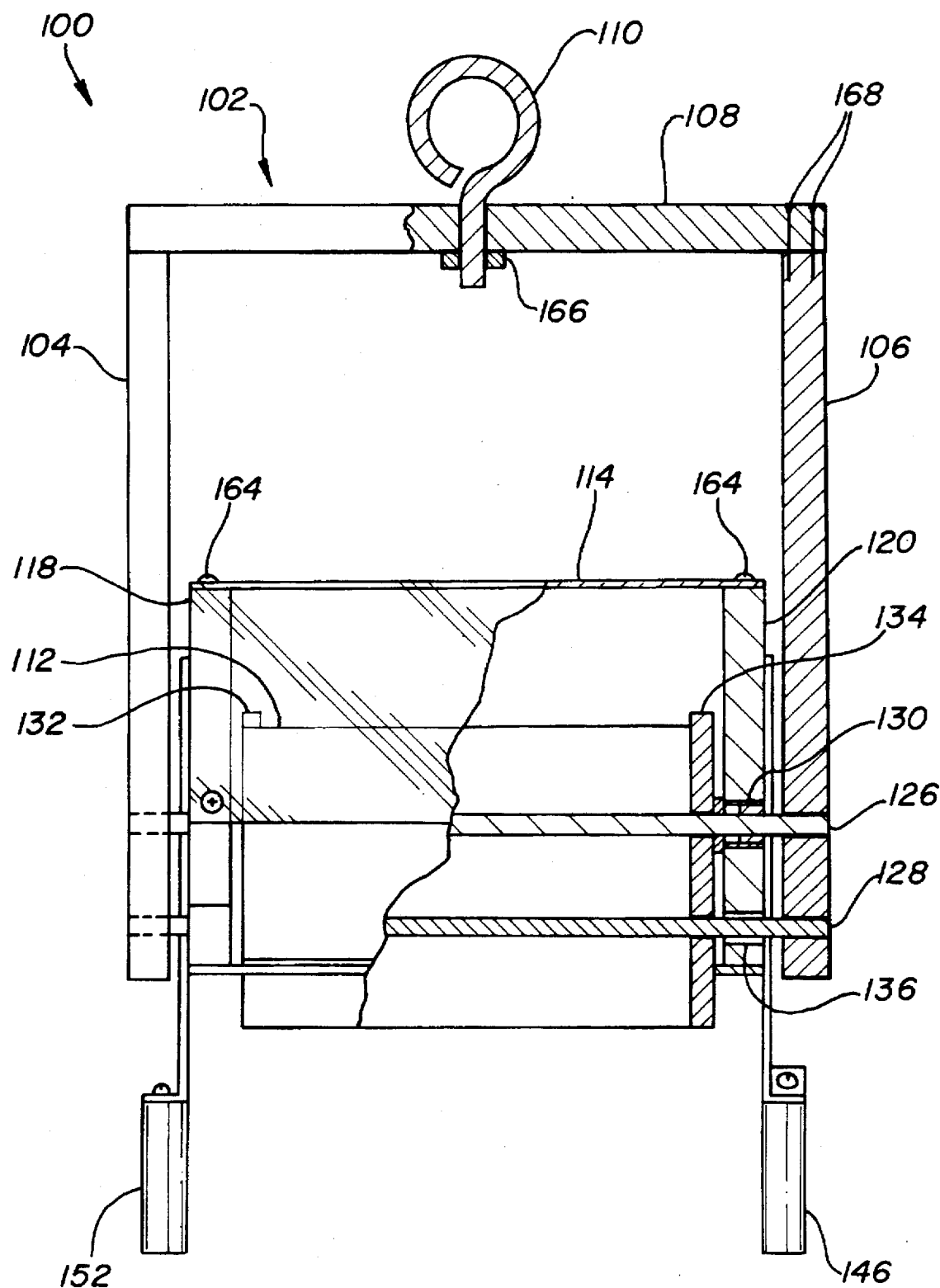
FIG. 2 is a side view and partial cross section of the feeder of FIG. 1 showing the feed chute fixed to the frame by a shaft and a through member, and the rotateable feed chute cover disposed between the frame and the feed chute.

FIG. 2 is a side view and partial cross section of feeder 100, viewed from perch 124 side. Feed chute ends 132 and 134 of feed chute 112 are fixed to column 104 and 106 of frame 102 by shaft 126 and a chute brace or through member 128. Chute cover 114 pivots about shaft 126 at bushing 130 of chute cover end 120 and a similar bushing (not shown) in chute cover end 118. Clearance for through member 128 is provided by arcuate opening 136 of chute cover end 120 when chute cover 114 pivots about shaft 126. A similar arcuate opening (not shown) is provided in chute cover end 118 to provide clearance for through member 128.

FIG. 3 is an end view of feeder 100 in the normal feeding position. Feed chute 112 comprises side panel 138 and side panel 140. Chute bottom 144 supplies feed (not shown) to feed tray 116 and 117. Optional feed divider plate 113 allows dividing chute 112 into two portions. Optional secondary feed chute cover 115 provides additional protection to prevent undesired access to the feed in feed chute 112 and to provide additional protection from the elements. Secondary feed chute cover 115 is removable and may be retained by ledges 119 of secondary cover 115, or by hinges (not shown). Divider plate 113 and secondary feed chute cover 115 are omitted from the other figures for clarity.

Weight 146 biases chute cover 114 in the clockwise direction through lever arm 148 pivoting about shaft 126 and engaging stop 150 fixed to chute cover end 120. Weight 152 biases chute cover 114 in the counter-clockwise direction through lever arm 154 pivoting about shaft 126 and engaging stop 156 fixed to chute cover end 118 (FIG. 2). Fastener 158 fixes stop 150 to chute cover end 120 and fastener 160 fixes stop 156 to chute cover end 118. Stop 162 attached to column 106 of frame 102 prevents clockwise rotation of lever arm 148 past the position shown in FIG. 3. Stop 164 attached to column 104 of frame 102 prevents counter-clockwise rotation of lever arm 154 past the position shown in FIG. 3. Thus, rotation of chute cover 114 engages only one weight (146 or 152 and its corresponding lever arm and stop) to bias the cover back to the position of FIG. 3. This arrangement results in an extremely stable platform in that the weight of the bird or other animal on perch 124 or 125 must be sufficient to cause an upsetting rotational moment about shaft 126 greater than the restoring moment of weights 146 or 152 before any rotation of the chute cover and perch occurs.

FIG. 4 is an end view of embodiment 100 of the feeder in a second position corresponding to an upsetting moment causing counter-clockwise rotation of chute cover 114 about shaft 126. This upsetting moment may be the result of a squirrel (not shown) on perch 125. The upsetting moment resulting from the weight of the animal overcomes the restoring moment caused by weight 146 acting through lever arm 148 and engaging stop 150 of chute cover end 120. In this position, the animal is dislodged from perch 125, allowing chute cover 114 to return to the normal position of FIG. 3. The arcuate shape of chute cover top 122 further prevents the animal from clinging to the chute cover. Arcuate opening 136 of chute cover end 120 provides clearance for through member 128 to allow rotation of chute cover 114 about shaft 126.

Chute cover top 122 is fixed to chute cover ends 118 and 120 by fasteners 164 of FIG. 2. Hook 110 of frame 102 is secured to cross member 108 by nut 166. Cross member 108 is fixed to column 106 by fasteners 168. Cross member 108 is fixed to column 104 by similar fasteners. In an alternative embodiment, columns 104 and 106 may be extended and a second cross member or base (not shown) attached to the columns.

In use, chute cover 114 is rotated as shown in FIG. 4 to provide access to feed chute 112 for filling. Upon filling of feed chute 112, feed is available at feed trays 116 and 117 of FIG. 3. Birds may feed at either side of feeder 100 at perch 124 or 125. Upon rotation of chute cover 114 to the position shown in FIG. 4, arcuate top 122 of chute cover 114 prevents access from perch 125 to feed tray 117. In a corresponding way, rotation of chute cover 114 in a clockwise direction from FIG. 3 (not shown) will result in chute cover top 122 preventing access to feed tray 116 from perch 124. Weights 146 and 152 are adjusted either in the amount of the weight or the length of the respective lever arm to discriminate feeding based on the weight of the animal. The restoring moment of weights 146 and 152 may also be adjusted by the angle from the vertical in the first or normal feeding position. In the preferred embodiment, this angle is 45 degrees. In other embodiments, the angle of the weights to the vertical can be 10 to 80 degrees.

Shaft 126 is not required to be a continuous member. Instead, pivot pins (not shown) and bushings may be used at either end of shaft 126 location. Likewise, a single brace at either column 104 or 106 may be used to fix feed chute 112 to frame 102.

Figure 5:
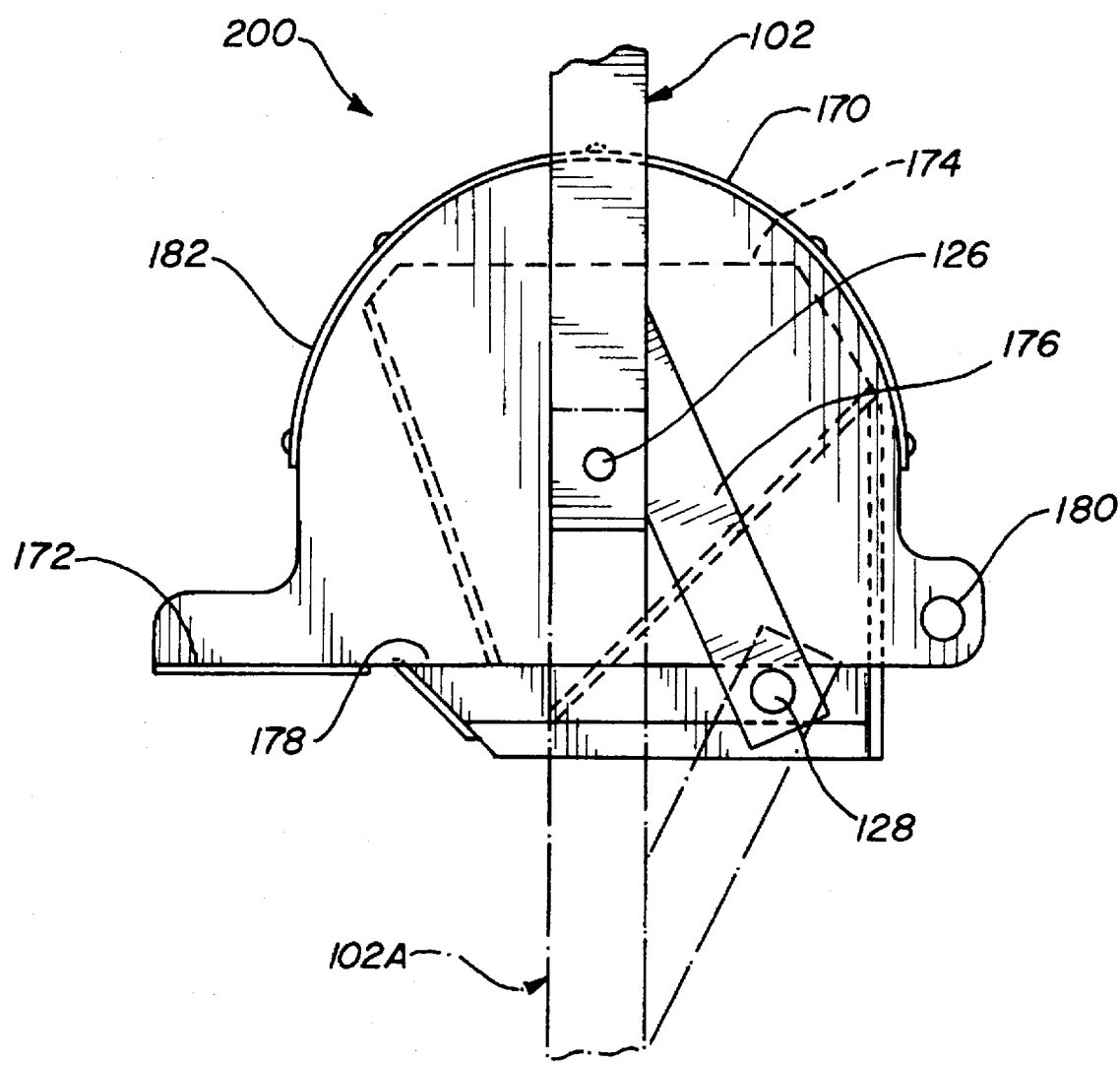
FIG. 5 is an end view of an alternative embodiment of the squirrel proof bird feeder in the normal feeding position, the feeder having a single feed tray and single perch.

FIG. 5 is an end view of embodiment 200 of a squirrel proof bird feeder employing chute cover 170 with a single perch 172. Feed chute 174 is fixed to U-shaped frame 102, similar to embodiment 100, by shaft 126 and through member 128 attached to frame bracket 176. Through member 128 serves a second function as a stop member to prevent clockwise rotation of chute cover 170.

Birds positioned on perch 172 have access to feed tray 178 of feed chute 174. A squirrel on perch 172 will cause an upsetting moment about shaft 126 sufficient to overcome the restoring moment of weight 180 about shaft 126. The resulting counter-clockwise rotation of chute cover 170 about shaft 126 will result in cute cover top 182 being disposed between perch 172 and feed tray 178, preventing feeding of the animal and dislodging the animal from the perch.

Optional divider plate 113 may be added to feed chute 112 as shown in FIG. 3 to allow different feed to be used in feed tray 117 and 118. Weights 146 and 152 may be made different or the length of lever arms 148 and 154 adjusted to allow different weight birds to feed at each side.

Frame 102 of feeder 200 may be reversed to support the feed chute and feed chute cover from below as shown in the broken lines as 102A. In this position, frame 102A may be used to mount feeder 200 to a post or table top.

Frame 102 provides a means for mounting feeder 100 and 200 to a number of different locations and supports. For example, frame 102 may be hung from a tree limb, roof overhang, or post arm. Frame 102 inverted, as in 102A of FIG. 5, may be mounted to a post, table top, or other horizontal surface. A base may be added to frame 102 for stand alone use.

In the preferred embodiment, the feeder frame, feed chute, and feed chute ends are made of wood. The chute cover top may be made of any material having a smooth hard surface which prevents the animal from maintaining a grip on the chute cover top. In the preferred embodiment, the chute cover top, and secondary chute cover are made of acrylic or other transparent plastic. Use of a transparent chute cover top and secondary chute cover (if used) allows viewing of the feed chute to determine the need for refilling of the chute. The shaft, weights, and lever arms are made of metal. In an alternative embodiment, the feeder is made of plastic.

Accordingly the reader will see that the SQUIRREL PROOF BIRD FEEDER provides a device that is attractive and provides convenient feeding for birds. The feeder prevents feeding of squirrels and other pests. The device provides the following additional advantages:
The device allows feeding from two sides at once;
The feeder can be adjusted to discriminate by the weight of the animal;
Different feeds can be used by the same feeder for different weight birds;
The feeder is very stable until a large animal attempts to feed;
The feeder is easy to load with feed;
The feed in the feed chute is protected from the elements;
The feeder can be mounted in a variety of ways; and
The device is simple and low in cost.

Although the description above contains many specifications, these should not be construed as limiting the scope of the invention but as merely providing illustrations of some of the presently preferred embodiments of this invention. For example, springs could be used instead of weights. The frame could be omitted and the chute cover and weights supported from the feed chute, etc. Thus the scope of the invention should be determined by the appended claims and their legal equivalents, rather than by the examples given.

I claim:

1. A squirrel proof bird feeder for feeding birds, the feeder comprising:
   (a) a frame comprising a first column and a second column, the first column and the second column connected by at least one cross member;
   (b) a feed chute disposed between and fixed to the first column and the second column, the feed chute comprising a feed tray on a side of the feed chute;
   (c) a feed chute cover, the cover comprising a first end, a second end, an arcuate shaped top, and a perch fixed to the chute cover, the first end disposed between the first column and the feed chute and the second end disposed between the second column and the feed chute, the first end pivotally attached to the first column and the second end pivotally attached to the second column, the chute cover being rotateable between a first position wherein the perch is open to the feed tray and a second position wherein the chute cover is disposed between the perch and the feed tray;
   whereby the weight of an undesired animal upon the perch is sufficient to rotate the chute cover from the first position to the second position.

2. The feeder of claim 1 wherein the first end is pivotally connected to the first column and the second end is pivotally connected to the second column by a shaft extending between the first column and the second column.

3. The feeder of claim 2 wherein the feed chute is fixed to the frame by the shaft and a chute brace, the chute brace attached to the feed chute and the frame.

4. The feeder of claim 3 wherein the first end comprises a first arcuate opening and the chute brace is fixed to the feed chute and the first vertical column, the chute brace passing through the first arcuate opening.

5. The feeder of claim 4 wherein the second end comprises a second arcuate opening and the feed chute is fixed to the frame by a through member extending from the first column to the second column, the through member passing through the first arcuate opening and the second arcuate opening.

6. The feeder of claim 1 wherein an angle of rotation between the first position and the second position is greater than 30 degrees.

7. The feeder of claim 1 comprising a removable secondary feed chute cover, the secondary cover covering a top opening of the feed chute.

8. The feeder of claim 1 wherein the chute cover is biased against a first stop in the first position by a weight, the first stop attached to the frame and engageable with the chute cover.

9. The feeder of claim 1 wherein the feed chute comprises a first feed tray fixed to a first side of the feed chute and a second feed tray fixed to a second side of the feed chute, and wherein the chute cover comprises a first perch fixed to a first side of the chute cover and a second perch fixed to a second side of the chute cover, and wherein the chute cover is rotateable from a first position in which the first feed tray is open to the first perch and the second feed tray is open to the second perch, to a second position in which the chute cover is disposed between the first feed tray and the first perch, and a third position in which the chute cover is disposed between the second feed tray an the second perch.

10. The feeder of claim 9 wherein the chute cover is biased in the first position by a first weight and a second weight, the first weight pivotally mounted to the feed chute cover and resting on a first stop attached to the frame until engaged by a first chute cover stop when the chute cover is rotated from the first position toward the second position, and wherein the second weight is pivotally mounted to the feed chute cover and resting on a second stop attached to the frame until engaged by a second chute cover stop when the chute cover is rotated from the first position toward the third position.

11. A squirrel proof bird feeder for feeding birds, the feeder comprising:

(a) a feed chute, the feed chute comprising a first feed tray and a second feed tray;

(b) a feed chute cover, the cover comprising a first perch and a second perch, the cover attached by at least one pivot member to the feed chute the feed chute cover being rotateable between a first position wherein the first feed tray is open to the first perch and the second feed tray is open to the second perch, a second position wherein the chute cover is disposed between the first feed tray and the first perch, and a third position wherein the chute cover is disposed between the second feed tray and the second perch;

(c) a first weight engaging a first stop on the chute cover to bias the chute cover towards the first position only when the chute cover is rotated towards the second position; and (d) a second weight engaging a second stop on the chute cover to bias the chute cover towards the first position only when the chute cover is rotated towards the third position.

12. The feeder of claim 11 wherein said feed chute cover comprises a first end, a second end, and an arcuate shaped top.

13. The feeder of claim 12 wherein said at least one pivot member is a shaft engaging the feed chute and extending from the first end of the feed chute cover to the second end of the feed chute cover.

14. The feeder of claim 13 wherein the first and second weights pivot about the shaft.

15. The feeder of claim 11 wherein the feed chute comprises a divider plate separating the first feed tray from the second feed tray.

16. The feeder of claim 15 wherein a first restoring moment caused by rotation towards the second position is different from a second restoring moment caused by rotation towards the third position.

* * * * *